UNITED STATES PATENT OFFICE.

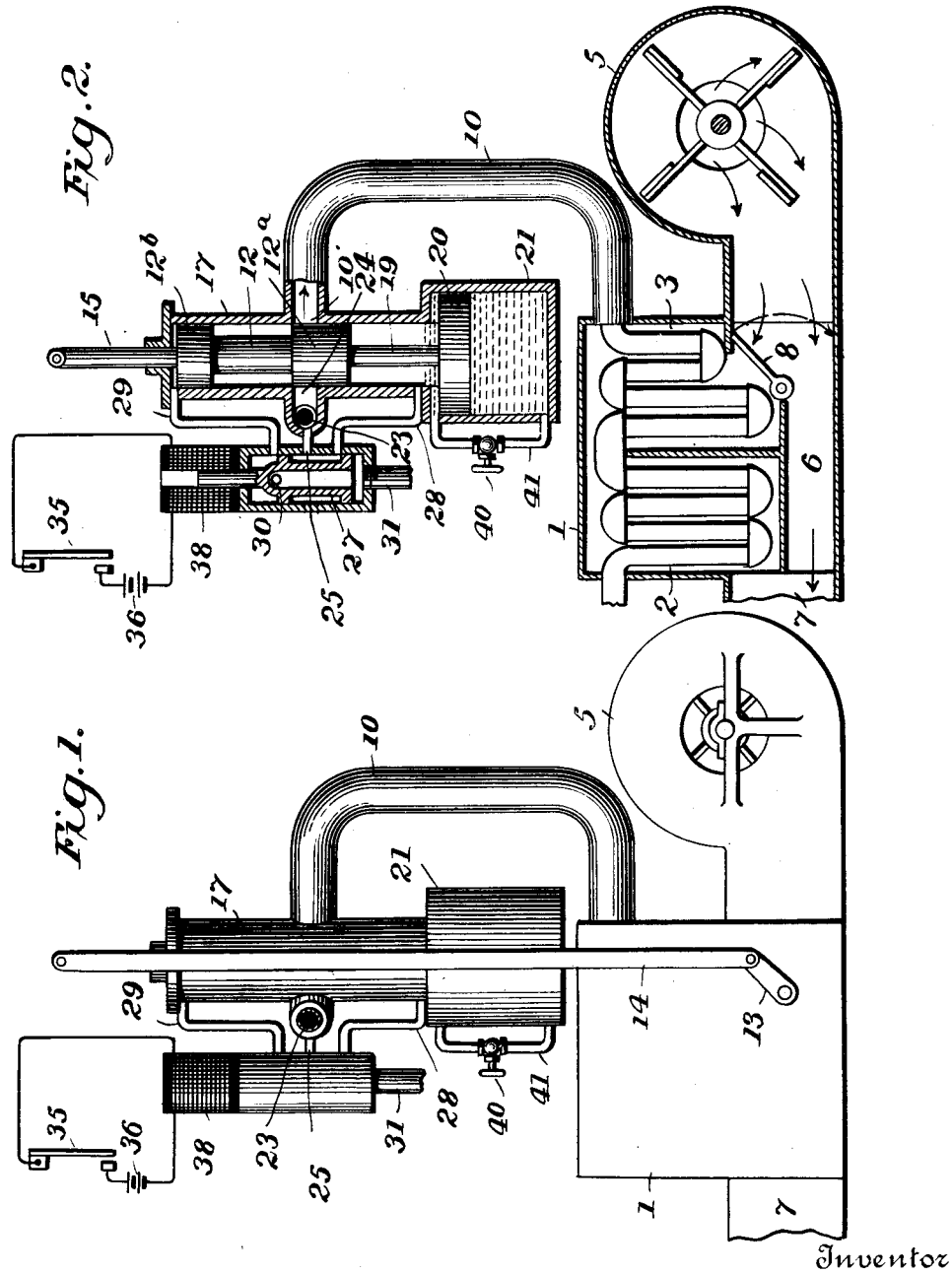

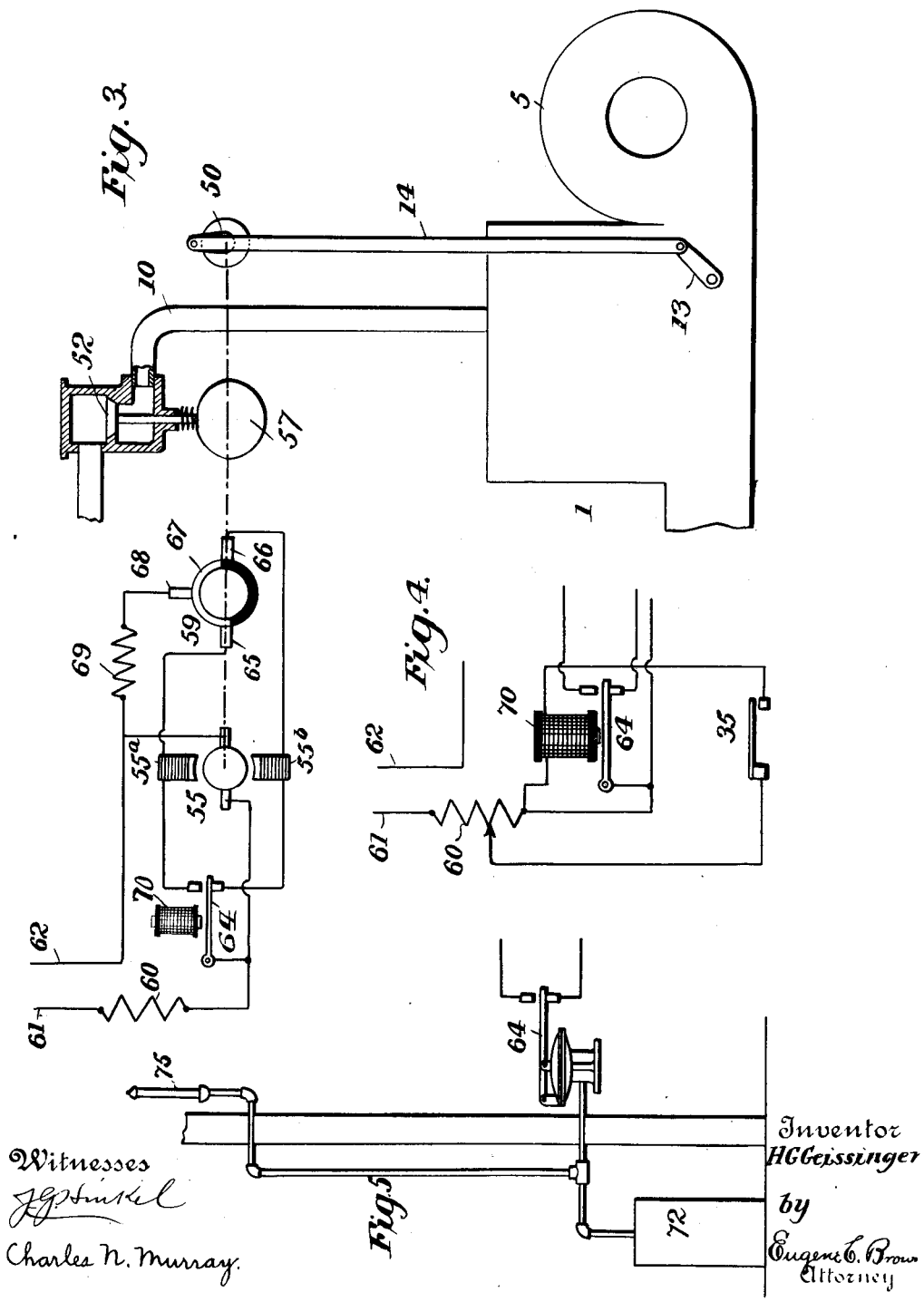

HARRY G. GEISSINGER, OF NEW YORK, N. Y., ASSIGNOR TO GEISSINGER REGULATOR COMPANY, OF NEW YORK, N. Y., A CORPORATION OF NEW YORK.

AUTOMATIC TEMPERATURE-REGULATING SYSTEM.

1,144,032.

Specification of Letters Patent.

Patented June 22, 1915.

Application filed February 26, 1910. Serial No. 546,248.

*To all whom it may concern:*

Be it known that I, HARRY G. GEISSINGER, a citizen of the United States, residing at New York, in the county of New York and State of New York, have invented new and useful Improvements in Automatic Temperature-Regulating Systems, of which the following is a specification.

My invention relates to the automatic control of temperatures in buildings and particularly to the control of indirect forced-air heating.

It is common in systems of indirect heating in which air is heated by passing it over steam coils or other heating devices and then delivered through air-ducts or conduits to the different apartments, to regulate the temperature of the heated air by by-passing adjustable amounts of cold air around the heating coils and then uniting the two-currents of high and low temperature into a single current of the temperature desired. Such systems, however, are not truly automatic in their control of the heat supply and moreover, are wasteful of the heat energy, since they do not in any manner control the steam or other heating medium supplied to the heating device.

The principal object of my invention is to combine in a unitary system of control, the regulation of both the heating medium and the proportion of air which is shunted around the heating device.

My invention not only provides a system of duplex control of the air and heating medium which is truly automatic but also results in a decided economy in the heat supply. Any desired heating medium may be employed, that chosen for illustration in the present instance being steam.

Other important advantages will be apparent to those skilled in this art from the following description of my invention in connection with the accompanying explanatory drawings in which—

Figure 1, is a side elevation of one embodiment of my invention in which air is forced over steamheated coils, both steam and air being under automatic control; Fig. 2 is a vertical cross-section of the same; Fig. 3 illustrates diagrammatically an arrangement of electrical control of the valves regulating both the proportion of air passing over and shunted around the heating coils, and the flow of steam through the coils; Fig. 4 is a detail view of a part of the electrical controlling circuits; and Fig. 5 is a modification showing the controlling switch actuated by pneumatic or fluid pressure.

Referring to the arrangement of Figs. 1 and 2, the heater 1 contains the heating coils 2, over which the air to be heated is forced by means of the blower 5. The proportion of air which may pass at any instant over the heating coils and that shunted through the by-pass 6 directly into the main air-duct 7, is determined by the position of the valve or damper 8, while the amount of steam entering the heating coils from the pipe 10 is under the control of the piston 12. The lever-arm 13 of the air-valve 8 is connected, as by means of a link 14 with the piston-rod 15, so that the position of the piston 12 in the casing or cylinder 17, definitely determines the ratio between the currents of heated and cold air passing to the air-conduit 7 and simultaneously the amount of steam passing to the heater coils. I believe that I am the first to control both the currents of hot and cold air and also the supply of the heating medium passing to the heater. A number of important advantages arise from this duplex control of the heating medium and the proportion of heated air. It will be seen at once by heating engineers that my method of regulating the temperatures of the air supplied to the air-duct is much more sensitive than the systems heretofore employed and that the heater can, therefore, respond more quickly to the directing influence of the thermal device.

I have shown the motor-valve which actuate the air valve 8 and controls the steam port 10', leading to the heater in the form of a spool-valve having pistons 12$^a$ and 12$^b$ and provided at one end with the piston rod 15 and at the opposite end having a stem 19, connected to the piston 20 of the dash-pot 21. Steam from the source of supply enters the cylinder from the steam pipe 23, through the port 24. In the position of the valve shown in Fig. 2, the ports 10' and 24 are completely closed by the piston valve 12$^a$, thus cutting off all steam from the coils of the heater.

For the purpose of reciprocating the piston 12, a pipe 25, connects the steam pipe 23 with the chest of the auxiliary controlling valve 27. When this valve is in its lower position as shown, steam is admitted into the pipe 28, and the piston 12 is raised the exhaust from the pipe 29 passing through the valve opening 30 and the outlet pipe 31. In Fig. 2 the ports are in position to lower the temperature, the air-valve 8 leading to the heater being closed and the piston valve 12ª having cut off the steam from the pipe 10 leading to the heater coils. As soon as the temperature in the apartment or room to be controlled has reached the critical degree, the thermostat 35, closes the circuit of the battery 36, through the solenoid 38, which thereupon raises its core and the valve 27, connecting the pipe 29 with the steam supply and opening the pipe 28 to the exhaust. The valve 12 now descends, gradually admitting steam to the pipe 10 leading to the heater and opening the air-valve or damper 8. Any fluctuation or "hunting" of the valve-actuating mechanism is prevented and any sudden or violent movement of the damper is prevented by the dash-pot which controls the movements of the piston 12. Instead of actuating the valve by steam it may be actuated by pneumatic pressure, the auxiliary valve-chest being connected to a source of compressed air through a suitable conduit.

The rapidity of movement of the piston valve may be regulated with precision by means of a valve 40, in the tube 41, through which the liquid must flow in passing from one side of the piston 20 to the other side. The flow of the liquid through the small pipe 41 and the graduated orifice in the valve 40, is the controlling factor in the movement of the valve mechanism and practically eliminates the effects due to changes in the frictional resistance of the piston valves 12ª, 12ᵇ or the valve 8, which might be caused by rusting of these ports. My arrangement of valve mechanism is, therefore, capable of precise adjustment which is not liable to variations as is the case in those systems where the movement of the damper depends upon spring action or to the variations in pressure in a compressed air supply or the variations in the orifice of a dip-valve. The absolute regularity and uniformity of action of my valve mechanism in which the effects of disturbing elements, such as friction, rust, varying pneumatic pressure, etc., are avoided, will be appreciated by those skilled in this art.

In Fig. 3 I have illustrated a manner in which the valves controlling the heating medium and the air-currents may be actuated by electric power. A crank 50, connected with the link 14 of the air by-pass damper and a valve 52, controlling the admission of steam to the heater pipe 10, are operated from a shaft driven by an electric motor 55. In order that the electric drive shall operate the valves in the same manner as previously described in regard to the steam or pneumatic control, causing the same to respond quickly and yet operating with a slow limited speed, I provide an arrangement having these characteristics.

The crank 50 connected with the link of the by-pass damper 8, the segmented disk 57 which actuates the valve 52 and the commutator ring 59, are carried by a shaft which is preferably connected by reduction gearing with the arbor of the motor 55, so that the speed of the motor may be much greater than that of the shaft. In order that the motor may have the characteristics of quick starting but comparatively slow, limited speed, I prefer to employ a shunt wound motor with separate and reversely wound field coils 55ª, 55ᵇ and to supply a current of substantially constant value. Such an arrangement is diagrammatically shown in Fig. 3. For the purpose of causing the current to be constant in value and to be substantially unaffected by the counter electromotive force of the motor a resistance 60 is interposed in one of the supply leads 61, and the armature connected between this resistance and the other lead 62. The field windings 55ª and 55ᵇ are connected in separate shunt circuits and are wound to produce opposite polarities so that the motor will rotate in opposite directions, depending upon which set of field coils is energized. The current through the respective field coils is determined by the switch 64 and the commutator 59, the switch being actuated in any suitable manner as hereinafter described. In the position shown the motor has rotated in an anti-clockwise direction and the current through its field coil 55ᵇ has been cut off by the brush 66 passing onto the insulating section of the commutator. In this position the crank 50 has raised the air by-pass 8 into the position to prevent the passage of air through the heater and the stem of the valve 52 has dropped upon the flat part of the disk 57, shutting off the steam supply from the heater. The flat portion of the disk may taper gradually into the circular portion. If now, the switch 64 is raised against its upper contact, a circuit will be established through the field coil 55ª, by way of the brush 65, the metal segment 67, common brush 68 and small regulating resistance 69 to the lead 62. This will cause the motor to rotate in the opposite or clock-wise direction, raising the steam valve 52 and gradually opening the air-valve, permitting air to pass through the heater. By the time the by-pass valve has swung to a position to close the by-pass, the brush 65 will have moved upon the insulating segment, thus stopping the motor. I have above pointed out that the large resistance 60 is the controlling factor in the circuit to cause a substantially constant current to flow through the motor which will have a large starting torque and will quickly acquire its full speed. The limiting speed will be attained at once by reason of the two factors entering therein, viz:—the counter electromotive force tending to decrease the current through the armature and the corresponding increase of current through the field coil caused to flow therethrough on account of this decrease through the armature. The resistance 69 in series with the field coil serves to absorb a certain proportion of the energy of the field circuit and to limit the flow of current through the field coil and consequently acts as a controller of the speed regulation. It will now be seen that I have provided the same characteristics for the operating mechanism of the valves, whether they be actuated electrically or by steam or pneumatic power.

It is obvious that the switch 64 may be actuated in different ways. In Fig. 4 I have indicated the same under the control of an electromagnet 70 connected in a branch circuit taken off from a small portion of the resistance 60 so that only a small voltage and current will flow in this circuit, which is under the control of a thermostat 35, located, as usual, in the room or apartment in which the temperature is to be regulated.

In Fig. 5, I have shown the switch 64, actuated by a pneumatic pressure-valve, connected in the ordinary manner to a source of compressed air 72 and under the control of a thermostat indicated at 75, the pipe leading from the source of compressed air having a restricted portion therein. It is obvious, also, that the switch 64 may be in the form of a thermostat and operate automatically under the direct control of the thermic changes.

I have described somewhat in detail different embodiments of my invention for purposes of illustration, but it is to be understood that there are other ways of carrying out this invention and that its scope is defined in the claims. Again, I have throughout the above description referred only to the control of heating systems, but it will be evident to engineers that my invention is equally applicable to the control of cooling or refrigeration systems. Furthermore, it will be understood that this invention is not limited to use with any particular temperature changing medium but that any desired heating or refrigerating medium may be employed.

Having thus described my invention and the manner in which it may be embodied, I claim—

1. A temperature regulating system, comprising means for supplying air thereto, a conduit for conveying a temperature-changing medium, means for heating a portion of said air-supply by causing it to pass over said conduit, and means for simultaneously varying the amount of the heated air portion and the amount of temperature-changing medium passing through said conduit, and maintaining the volume of air supplied to the system substantially constant.

2. A temperature regulating system, comprising means for supplying air thereto, a conduit for conveying a temperature-changing medium, means for heating a portion of said air-supply by causing it to pass over said conduit, controlling means for simultaneously varying the amount of the heated air portion and the amount of temperature-changing medium passing through said conduit proportionately, and maintaining the volume of air supplied to the system substantially constant, and means for regulating the operation of the controlling means.

3. A temperature regulating system, comprising means for supplying air thereto, a conduit for conveying a temperature-changing medium, means for heating a portion of said air-supply by causing it to pass over said conduit, controlling means for simultaneously varying the amount of the heated air portion and the amount of temperature-changing medium passing through said conduit proportionately, and maintaining the volume of air supplied to the system substantially constant, actuating mechanism therefor, adjustable retarding means to regulate the operation of the controlling means to thereby prevent fluctuations in the heat supply, and a thermostat controlling said actuating mechanism.

4. A temperature regulating system, comprising an air supply, a conduit for conveying a temperature-changing medium, means for shunting a portion of said air supply into contact with the walls of said conduit, controlling means for proportionately and simultaneously varying the amount of said shunted air portion and the amount of temperature-changing medium passing through said conduit, while maintaining the volume of air supplied to the system substantially constant, actuating means therefor, and governing means for rendering the operation of said controlling means independent of the friction or condition of the moving parts thereof.

5. A temperature regulating system comprising an air-duct, a temperature changing chamber connected therewith and provided with a by-pass channel, a heating conveying vehicle in said chamber, a valve regulating the passages through said chamber and said by-pass, respectively, proportioning means for varying the amount of said heat-conveying vehicle, actuating means for said valve and for said proportioning means, and a thermostatic device controlling the operation of said actuating means.

6. In a temperature regulating system, an air-duct, a heating chamber provided with a by-pass channel connected therewith, a damper for said chamber and said by-pass channel, steam conveying coils in said chamber, a valve for controlling the passage of steam through said coils, mechanism for causing said valve to proportion in varying amounts the steam passing through said valve and for controlling the position of said damper and a thermostat controlling the operation of said mechanism.

In testimony whereof I have hereunto set my hand in presence of two subscribing witnesses.

HARRY G. GEISSINGER.

Witnesses:
 LAURA E. SMITH,
 J. H. GOLDSTEIN.